United States Patent Office.

OTTO GAVRON, OF NEW YORK, N. Y.

Letters Patent No. 104,446, dated June 21, 1870.

IMPROVEMENT IN THE PREPARATION OF MINERAL BATH TO IMITATE MINERAL WATERS.

The Schedule referred to in these Letters Patent and making part of the same.

*To all whom it may concern:*

Be it known that I, OTTO GAVRON, of the city, county, and State of New York, have invented a new and improved Saponified Mineral Bath; and I do hereby declare that the following is a full, clear, and exact description thereof, which will enable others skilled in the art to make and use the same.

This invention has for its object to furnish a convenient surrogate for mineral baths, which can be brought into a condensed form, to be conveniently transported and handy for use.

The invention consists in combining the mineral and salts that are contained in the mineral waters with soap, so that the soap thus prepared can be used in baths with the same effect as the mineral waters alone.

The several compositions formed in the most celebrated springs can thus be reproduced and utilized for practical purposes. The soap or saponaceous matter, which is of suitable kind, is mixed with the crystallized ingredients which are known to compose the certain mineral waters, and will, when dissolved in water, impart to the same all the virtues and power of the true mineral water.

The soap may be either soft or hard, as may be desired.

One of the mineral waters to be thus reproduced consists of iodide of potassium, bromide of potassium, carbonate of soda, sulphuret of potassium, and other unimportant ingredients. These are, in the proper proportions, mixed with the soap. All different mineral waters may be thus reproduced, and I do not confine myself to any special kind of water or soap.

Having thus described my invention,

I claim as new and desire to secure by Letters Patent—

The saponified mineral bath herein described.

OTTO GAVRON.

Witnesses:
   CHS. RENTZ,
   A. V. BRIESEN.